(12) United States Patent
Kimura et al.

(10) Patent No.: US 8,733,725 B2
(45) Date of Patent: May 27, 2014

(54) POWER SLIDER

(75) Inventors: Akihiro Kimura, Fujisawa (JP); Tomohiro Enokijima, Fujisawa (JP)

(73) Assignee: Shiroki Corporation, Kanagawa (JP)

( * ) Notice: Subject to any disclaimer, the term of this patent is extended or adjusted under 35 U.S.C. 154(b) by 79 days.

(21) Appl. No.: 13/114,095

(22) Filed: May 24, 2011

(65) Prior Publication Data
US 2011/0284718 A1 Nov. 24, 2011

(30) Foreign Application Priority Data

May 24, 2010 (JP) .................................. 2010-118416

(51) Int. Cl.
*F16M 13/00* (2006.01)

(52) U.S. Cl.
USPC .................... 248/429; 297/344.11; 296/65.13

(58) Field of Classification Search
CPC ........................................................ B60N 2/06
USPC ............... 248/429, 430, 419, 424; 296/65.03, 296/65.13, 65.15; 280/47.25, 47.38, 47.4, 280/226.1; 297/344.11, 463.1
See application file for complete search history.

(56) References Cited

U.S. PATENT DOCUMENTS

| 5,150,872 | A  | * | 9/1992  | Isomura .......................... | 248/429 |
| 5,273,242 | A  | * | 12/1993 | Mouri et al. ................... | 248/429 |
| 5,848,775 | A  | * | 12/1998 | Isomura et al. ................ | 248/430 |
| 6,959,900 | B2 | * | 11/2005 | Hoshihara et al. ............ | 248/429 |
| 7,303,223 | B2 | * | 12/2007 | Nakamura et al. ......... | 296/65.15 |
| 7,658,429 | B2 | * | 2/2010  | Koga et al. .................. | 296/65.15 |
| 2010/0013284 | A1 | * | 1/2010  | Koga et al. ................... | 297/344.1 |
| 2010/0242650 | A1 | * | 9/2010  | Koga et al. ..................... | 74/416 |
| 2011/0095160 | A1 | * | 4/2011  | Kimura et al. ................ | 248/429 |
| 2012/0145868 | A1 | * | 6/2012  | Okada et al. .................. | 248/429 |

FOREIGN PATENT DOCUMENTS

| JP | 61051235     |   | 4/1986  |
| JP | 02-106930    |   | 8/1990  |
| JP | 06-336130    |   | 12/1994 |
| JP | 11 311303    |   | 11/1999 |
| JP | 2009090942 A | * | 4/2009  |
| JP | 2009060342   | * | 6/2009  |

(Continued)

OTHER PUBLICATIONS

Shiroki Corp., "Installation structure for gear box," Patent Abstracts of Japan, Publication Date: Nov. 9, 1999; English Abstract of JP-11 311303.

(Continued)

*Primary Examiner* — Terrell McKinnon
*Assistant Examiner* — Eret McNichols
(74) *Attorney, Agent, or Firm* — Millen, White, Zelano & Branigan, P.C.

(57) ABSTRACT

A power slider includes a lower rail and an upper rail which are engaged with each other so as to be mutually slidable along each other, a screw rod which is rotatably supported on one of the lower rail and the upper rail, a feed nut which is supported on the other of the lower rail and the upper rail and is screw-engaged with the screw rod, and a gearbox which is supported on the one of the lower rail and the upper rail via a holder and which rotatably drives the screw rod. The gearbox is provided with a mounting bolt through-hole and is supported by the holder via a mounting bolt that is inserted through the mounting bolt through-hole. A resilient member is positioned in a space defined between the mounting bolt through-hole of the gearbox and the mounting bolt.

5 Claims, 4 Drawing Sheets

(56) References Cited

FOREIGN PATENT DOCUMENTS

| JP | 2010 006098 | 1/2010 | | |
| WO | WO 2009047948 A1 | * | 4/2009 | ............... B60N 2/06 |

OTHER PUBLICATIONS

Shiroki Corp., "Power slide device vehicular seat," Patent Abstracts of Japan, Publication Date: Jan. 14, 2010; English Abstract of JP-2010 006098.

English Abstract of JP-06-336130; Power Seat Sliding Device; Patent Abstracts of Japan, Jun. 12, 1994.

English Translation of Claim 1, JP-2106930; Aug. 24, 1990.

English Translation of Claim 1, JP-61051235; Apr. 7, 1986.

Japanese Patent Application No. 2010-118415; Office Action issued Mar. 11, 2014.

* cited by examiner

Fig.2

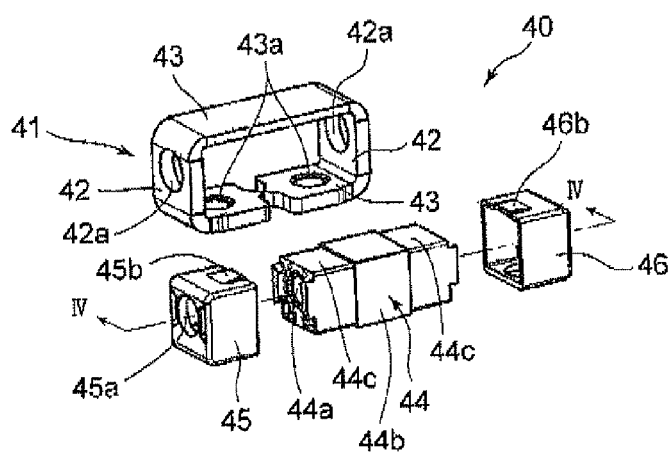
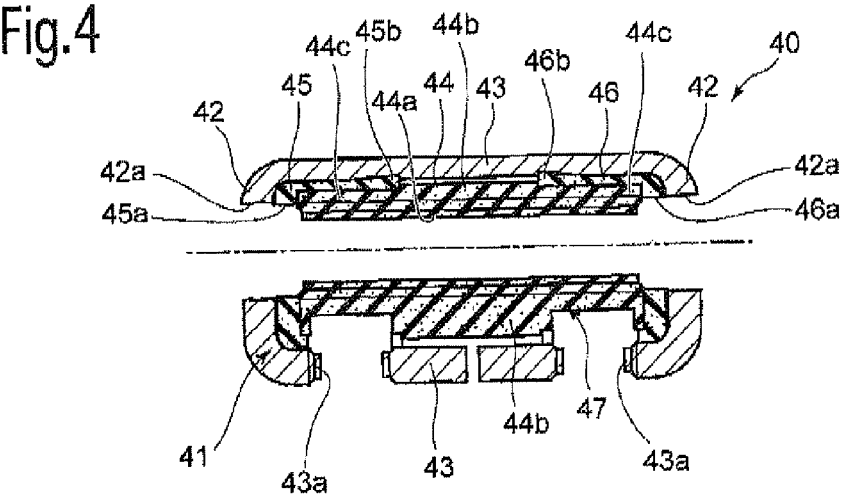

US 8,733,725 B2

POWER SLIDER

BACKGROUND OF THE INVENTION

1. Field of the Invention

The present invention relates to a power slider for use, e.g., in a vehicle for slidably moving a vehicle seat.

2. Description of Related Art

Generally, a power slider comprises a lower rail, an upper rail that is engaged with the lower rail so as to be mutually slidably along each other, a screw rod (spindle) and a feed nut which are supported on one and the other of the lower rail and the upper rail, the feed nut being screw-engaged with the screw rod. The power slider is further provided with a gearbox, which rotatably drives the screw rod via a holding bracket (holder), on the rail which supports the screw rod (screw-rod supporting rail).

The gearbox is provided with a mounting-bolt through-hole, and the gearbox is supported by the holding bracket (holder) via a mounting bolt that is inserted through the mounting-bolt through-hole. Furthermore, the gearbox supports a rotational mechanism (including a worm that is rotatably driven by a motor, and a worm wheel which is screw-engaged with the worm) which rotates the screw rod.

The applicant of the present invention has proposed a gearbox provided with a vibration-absorption rubber sheet (Japanese Unexamined Patent Publication No. 2010-6098) for cutting out/reducing the transmission of vibrations generated by (the rotational mechanism of) the gearbox to the holding bracket (holder) and the screw-rod supporting rail.

However, according to the inventors of the present invention, since a slight amount of space (clearance) is provided between the mounting-bolt through-holes and the mounting bolts, the gearbox cannot sufficiently conform to the undulations that occur in the rotation of the screw rod (i.e., eccentrical rotation with respect to the ideal rotational axis of the screw rod), so that the transmission of vibrations between the gearbox and the screw-rod support rail cannot be sufficiently suppressed. Furthermore, there is the possibility of abnormal noise occurring when the mounting bolts contact the wall surface of the mounting-bolt through-holes of the gearbox.

SUMMARY OF THE INVENTION

The present invention has been devised with consideration of the above-described problems and achieves a power slider in which a gearbox favorably conforms to (follows) the undulations that occur in the rotation of the screw rod, wherein transmission of vibration between the gearbox and the screw-rod support rail can be adequately suppressed, and does not generate abnormal noise.

The present invention has been devised with a focus on providing a resilient member and placing this resilient member into a space between the mounting-bolt through-hole of the gearbox and the mounting bolt, therefore, since this resilient member absorbs undulations that occur during the rotation of the screw rod while allowing for movement of the mounting bolt within the mounting-bolt through-hole, the gearbox can conform to the undulations that occur during the rotation of the screw rod and can suppress the transmission of vibration between the gearbox and the screw-rod support rail; and furthermore, since the mounting bolt does not come in contact with the wall surface of the gearbox in which the mounting-bolt through-hole is formed, abnormal noise can be prevented from occurring.

Namely, according to an aspect of the present invention, a power slider is provided, including a lower rail and an upper rail which are engaged with each other so as to be mutually slidable along each other; a screw rod which is rotatably supported on one of the lower rail and the upper rail; a feed nut which is supported on the other of the lower rail and the upper rail and is screw-engaged with the screw rod; and a gearbox which is supported on the one of the lower rail and the upper rail via a holder and which rotatably drives the screw rod. The gearbox is provided with a mounting bolt through-hole and is supported by the holder via a mounting bolt that is inserted through the mounting bolt through-hole. A resilient member is positioned in a space defined between the mounting bolt through-hole of the gearbox and the mounting bolt.

It is desirable for the resilient member to be provided with a facing wall which is positioned in between mutually facing surfaces of the holder and the gearbox.

It is desirable for the mounting bolt through-hole of the gearbox to extend in a direction parallel to the axis of the screw rod, and for a pair of the facing walls of the resilient member to be separated in a direction parallel to the axis of the screw rod and to be each positioned between the mutually facing surfaces of the holder and the gearbox so that the gearbox is sandwiched between the pair of mutually facing walls.

It is desirable for the holder to include a U-shaped section defined by a pair of mutually facing walls and a connecting portion which connects the pair of mutually facing walls, wherein the connecting portion is provided with an insertion groove. The resilient member is provided with a neck portion which is fitted into the insertion groove, and a fall-out prevention portion which is connected to the connecting portion via the neck portion.

In an embodiment, a power slider is provided, including a screw rod supporting rail which supports a screw rod; a feed nut supporting rail which supports a feed nut that is screw-engaged with the screw rod, the screw rod supporting rail and the feed nut supporting rail being engaged with each other so as to be relatively slidable in length-wise directions thereof; and a gearbox which is supported on the screw rod supporting rail to drive the screw rod. The gearbox is provided with a mounting bolt through-hole, through which a mounting bolt is inserted to mount the gearbox onto the screw rod supporting rail. A resilient member is positioned in an annular space defined between the mounting bolt through-hole of the gearbox and the mounting bolt.

According to the present invention, a power slider can be achieved in which a gearbox favorably conforms to undulations that occur in the rotation of the screw rod, transmission of vibration between the gearbox and the screw-rod support rail can be adequately suppressed, and abnormal noise is not generated.

The present disclosure relates to subject matter contained in Japanese Patent Application No. 2010-118416 (filed on May 24, 2010) which is expressly incorporated herein in its entirety.

BRIEF DESCRIPTION OF THE DRAWINGS

The present invention will be discussed below in detail with reference to the accompanying drawings, in which:

FIG. 2 is a cross-sectional view, taken along a line II-II of FIG. 1, of a right-side lower rail, a right-side upper rail, a right-side nut unit, a right-side load transfer bracket, a right-side screw rod, a right-side gear box, a metal holding bracket, a right-side resilient member and a right-side mounting bolt, in an assembled state;

FIG. 3 is an exploded perspective view of the nut unit;

FIG. 4 is a cross-sectional view, taken along a line IV-IV of FIG. 3, showing the nut unit in an assembled state.

DESCRIPTION OF THE EMBODIMENT

Figure 1:
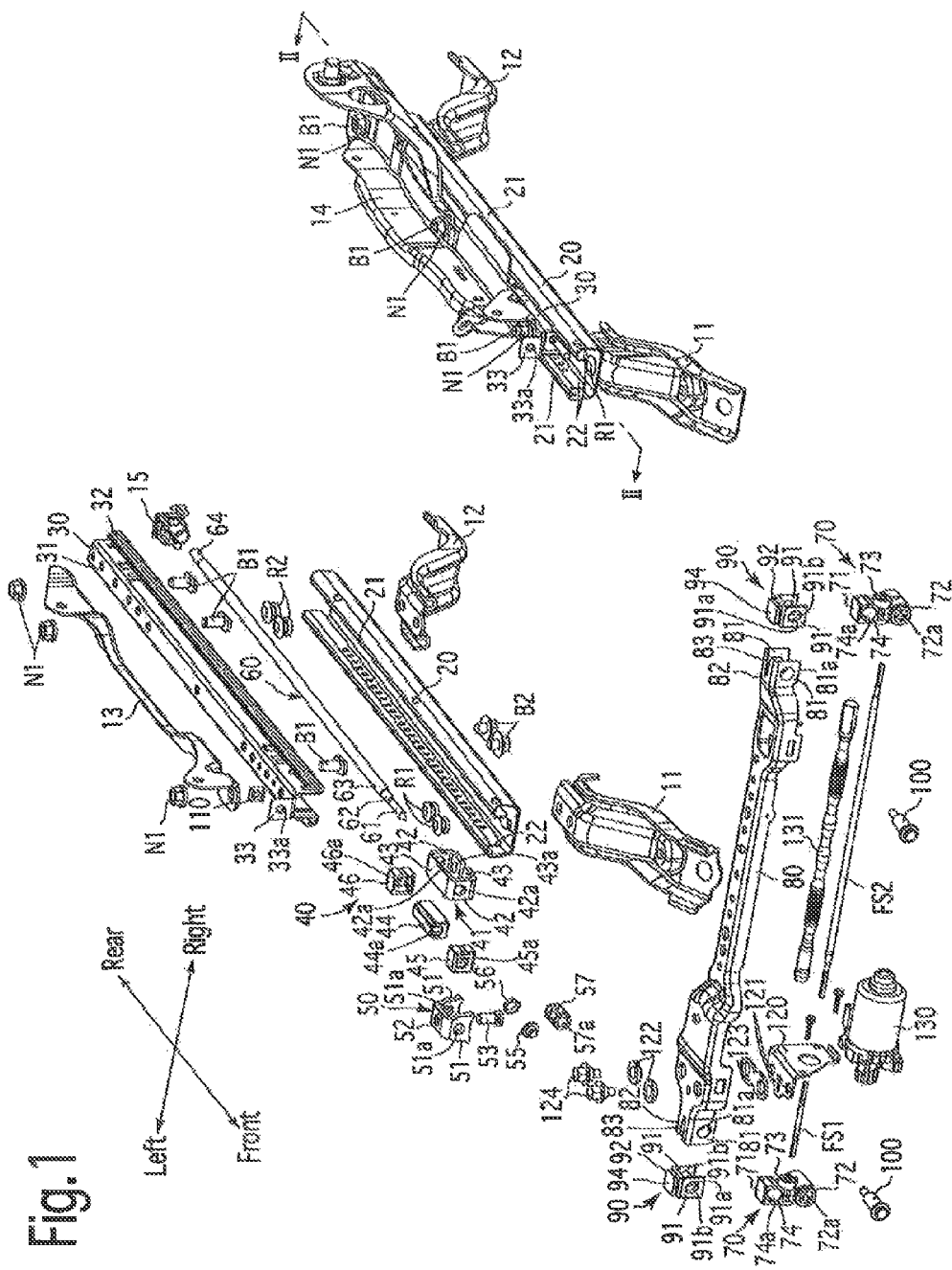
FIG. 1 is an exploded perspective front view of a power slider according to an embodiment of the present invention.

An embodiment of a power slider to which the present invention is applied will be hereinafter described with reference to FIGS. 1 through 4. The front/rear directions and left/right directions referred to in the following descriptions signify the directions as indicated by arrows in the drawings.

A front bracket 11 and a rear bracket 12, which constitute a pair of brackets, are fixed onto a floor inside a vehicle (not shown) so that one (left) pair of front and rear brackets 11 and 12 are arranged on the left side on the floor and another (right) pair of front and rear brackets 11 and 12 are arranged on the right side on the floor. The upper surfaces of the left and right pairs of front and rear brackets 11 and 12 are fixed to underside surfaces of left and right lower rails (feed-nut support rails) 20, at the front and rear ends thereof by rivets R1 and R2, respectively. The lower rails 20 are each formed as a metal channel member that linearly extends in the front/rear directions, and includes left and right horizontal upper-portions 21 that project inwardly from upper edges of respective left and right side-walls of the metal channel member. Downward-extending portions 22 project downwardly from inwardly facing edges of the left and right upper-portions 21, respectively. Left and right upper rails (screw-rod support rails) 30 (constituting a pair of upper rails), each of which is formed from a metal channel member that extends in the front/rear direction and is provided on a (vehicle) seat, are slidably engaged with the left and right lower rails 20, respectively. Each upper rail 30 includes a body section 31 constituting an upside down U-shaped section, and upward-facing engaging portions 32 which extend outwardly from both left and right sides, respectively, of the body section 31 and thereafter extend upwardly. Each upper rail 30 is positioned in each corresponding lower rail 20 with the left and right upward-facing engaging portions 32 positioned in each space defined by the left and right side walls of the lower rail 20 and the left and right downward-extending portions 22, respectively, and the body section 31 is positioned in between the left and right downward-extending portions 22 of the lower rail 20 so that the upper rails 30 are slidably engaged with the lower rails 20, respectively. A left seat bracket 13 and a right seat bracket 14 are respectively fixed to the upper surfaces of the left and right upper rails 30 by a plurality of nuts N1 and bolts B1. Left and right sides of the underside of a vehicle seat (not shown) are fixed to the left seat bracket 13 and the right seat bracket 14, respectively. A cut-and-raised portion 33 which projects upwardly from the body section 31 is formed on a front end of each of the left and right upper rails 30. A through-hole 33a is formed through each cut-and-raised portion 33.

A nut unit 40 is supported on the base surface of each of the left and right lower rails 20 by a pair of front and rear bolts B2. The nut unit 40 is configured of a metal case (carrier bracket) 41, a resin nut (carrier nut/feed nut) 44 and a pair of resilient members 45 and 46; the resin nut 44 and the pair of resilient members 45 and 46 are accommodated inside the metal case 41. The metal case 41 is provided with a pair of axially separated walls 42 and a pair of axially parallel plates 43. A pair of female screw-holes 43a are formed in the lower of the axially parallel plates 43. Hence, each nut unit 40 is supported by each lower rail 20 by the pair of bolts B2 (which are also screwed through the base section of the corresponding lower rail 20) being respectively screw-engaged with the pair of female screw-holes 43a.

As shown in FIGS. 3 and 4, the resin nut 44 includes a central base portion 44b, and (two) insertion portions 44c which extend forwardly and rearwardly from each end of the central base portion 44b, respectively. The cap-shaped resilient members 45 and 46 are fitted onto the insertion portions 44c, respectively. Upwardly protruding inclined surface-portions 45b and 46b are formed on the top surfaces (the surfaces which directly face the inner side of the upper plate of the axially parallel plates 43) of the resilient members 45 and 46, respectively. The inclined surface-portions 45b and 46b protrude upwardly in a state where the resilient members 45 and 46 are fitted onto the insertion portions 44c, respectively, of the resin nut 44. The underside surfaces (the surfaces which directly face the lower of the axially parallel plates 43) of the resilient members 45 and 46 are flat surfaces. As shown in FIG. 4, upon a combined member 47, consisting of the resin nut 44 and the resilient members 45 and 46, being accommodated (press-fitted) into the metal case 41, the front end of the resilient member 45 and the rear end of the resilient member are forcefully driven up against the front axially separated wall 42 and the rear axially separated wall 42, respectively, and hence, these members constitute an assembled nut unit 40 with the axial position (i.e., the position with respect to the front/rear direction) of the combined member 47 the resin nut 44 and the resilient members 45 and 46) in a restricted state. With the nut unit 40 in the assembled state, the combined member 47 is accommodated inside the metal case 41 in a "floated state" so as to be movable in a direction orthogonal to the axial direction thereof (i.e., in a vertical direction). Specifically, the inclined surface-portions 45b and 46b of the resilient members 45 and 46 resiliently abut against the inner surfaces of the upper plate of the axially parallel plates 43 of the metal case 41 so that a gap is formed (defined) between the top surface of the central base portion 44b and the inner surface of the upper plate of the axially parallel plates 43, and a gap is formed (defined) between the top surfaces of the resilient members 45 and 46 (except for the inclined surface-portions 45b and 46b) and the inner surface of the upper plate of the axially parallel plates 43. Whereas, the underside surfaces of the resilient members 45 and 46 resiliently abut against the inner surface of the lower of the axially parallel plates 43 of the metal case 41 so that a gap is formed (defined) between the underside surface of the central base portion 44b and the inner surface of the lower part of the axially parallel plates 43. Accordingly, the resin nut 44 can be moved within the metal case 41 in a direction orthogonal to the axial direction thereof by elastically deforming the inclined surface-portions 45b and 46b of the top surfaces of the resilient members 45 and 46 and the underside surfaces of the resilient members 45 and 46.

A through-hole 42a is formed in each of the axially separated walls 42 of the metal case 41, and through-holes 45a and 46a are respectively formed through the resilient members 45 and 46. A female screw-hole 44a is formed completely through the resin nut 44 (the central base portion 44b and the insertion portions 44c) so as to align with the positions of the through-holes 42a, 45a and 46a.

Figure 2:
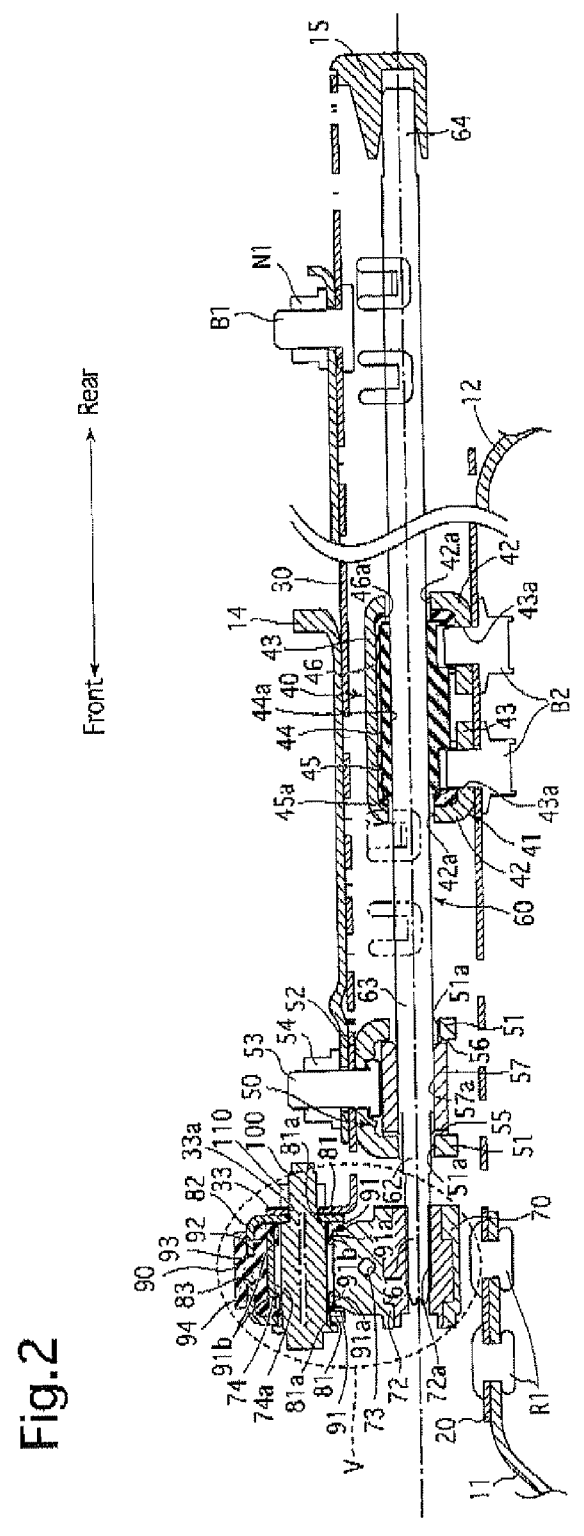

A load transfer bracket 50 is supported at the front end of each body section 31 of the left and right upper rails 30. As shown in FIGS. 1 and 2, the load transfer bracket 50 is U-shaped and includes a pair of load transfer walls 51, which are separated from each other in the axial direction, and a mounting plate 52 which connects the pair of load transfer walls 51 and extends along the corresponding upper rail 30. A through-hole 51a is formed through each of the pair of load transfer walls 51. As shown in FIG. 2, the load transfer bracket 50 is mounted to the (corresponding) upper rail 30 by a mounting bolt 53 that is inserted through the upper rail 30 from the mounting plate 52, and a mounting nut 54 that is screw-engaged onto the mounting bolt 53. Low-friction synthetic resin sleeves 55 and 56 are respectively fitted into the through-holes 51a of the pair of load transfer walls 51. A nut member (load-receiving member) 57 is positioned in between the pair of load transfer walls 51 so as to be sandwiched between the sleeves 55 and 56.

A screw rod (spindle) 60 is rotatably supported in each of the left and right upper rails 30 and is screw-engaged with the female screw-hole 44a in the resin nut 44 of the corresponding nut unit 40 that is mounted on each of the left and right lower rails 20. Namely, a gearbox 70 and a bearing member 15 rotatably support the front and rear ends of the screw rod 60, respectively, at the front and rear ends of each upper rail (screw-rod support rail) 30. The gearbox 70 is provided with a housing 71 which supports a worm wheel 72 and a worm 73 which engages with the worm wheel 72. The axis of the worm wheel 72 extends in the front/rear direction, and the axis of the worm 73 extends in the left/right direction. The screw rod 60 has a splined section 61 formed at the front end portion thereof, and the splined section 61 is engaged with a splined hole 72a, which is formed through the center (central axis) of the worm wheel 72, so as not to be relatively rotatable therewith (i.e., so that the worm wheel 72 rotates integrally with the screw rod 60). The screw rod 60 is provided with a non-threaded stepped section 62, which does not have a male thread, and a male threaded section 63, in that order rearwardly from the splined section 61. The male threaded section 63 is screw-engaged with a female threaded section 57a formed through the nut member 57 which is positioned between the pair of load transfer walls 51, and the male threaded section 63 is also screw-engaged with the female screw-hole 44a of the resin nut 44 of the nut unit 40. A rear-end bearing section 64 is formed at a rear end portion of the screw rod 60, and the rear-end bearing section 64 is supported by the bearing member 15 so as to be rotatable relative thereto and to be relatively slidable therein.

The left and right upper rails 30 are connected to each other by a metal holding bracket (holder) 80. Each of the left and right side ends of the holding bracket 80 is provided with a U-shaped section defined by a pair of mutually facing walls 81 which are separated from each other in a direction parallel to the axis of the screw rod 60 (i.e., in the front/rear direction) and a connecting plate (connecting portion) 82, which connects the pair of mutually facing walls 81. The pair of mutually facing walls 81 is provided with mounting bolt through-holes 81a, respectively, which mutually face (align with) each other in the front/rear direction. The left and right connecting plates 82 are each provided with a resilient-member insertion groove 83, which extends in the left/right direction, so that the left and right ends of the left and right connecting plates 82 are respectively open.

The left and right resilient-member insertion grooves 83 of the holding bracket 80 support the pair of left and right gearboxes 70, respectively. Each gearbox 70 is provided with a mount 74 which is positioned inside the corresponding U-shaped section (defined by the pair of mutually facing walls 81 and the connecting plate 82) at the left and right ends of the holding bracket 80. The mount 74 is provided with a mounting bolt through-hole 74a which extends in a direction parallel to the axis of the screw rod 60 (i.e., extends in a front/rear direction).

A resilient member 90 is provided between the left gearbox 70 and the left end of the holding bracket 80 and another resilient member 90 is provided between the right gearbox 70 and the right end of the holding bracket 80. Each resilient member 90 is provided with a U-shaped section defined by a pair of mutually facing walls 91, which are separated in a direction parallel to the axis of the screw rod 60 (front/rear direction), and a connecting portion 92 which connects the pair of mutually facing walls 91; this U-shaped section of the resilient member 90 is inserted inside the corresponding U-shaped section of the holding bracket 80 so as to be placed between the U-shaped section of the holding bracket 80 and the mount 74 of the of the gearbox 70. In other words, the connecting portion 92 of the resilient member 90 is positioned along the connecting plate 82 of the holding bracket 80 and is positioned (sandwiched) between the connecting plate 82 and the mount 74 of the gearbox 70, and the pair of mutually facing walls 91 of the resilient member 90 are separated in a direction parallel to the axis of the screw rod 60 (front/rear direction) so that the mount 74 of the gearbox 70 is sandwiched in between the pair of mutually facing walls 91 via the mutually facing surfaces 81 of the holding bracket 80 and the gearbox 70.

Cylindrical portions 91b are integrally formed on the pair of mutually facing walls 91, respectively, of the resilient member 90 and mutually approach (extend toward) each other on a common axis (that is parallel to the axis of the screw rod 60). The outer diameter of the inwardly extending cylindrical portions 91b are formed (set)) at a diameter so as to fit into the mounting bolt through-hole 74a formed in the mount 74 of the gearbox 70. Upon fitting the cylindrical portions 91b into the mounting bolt through-hole 74a, the gearbox 70 is engaged with the resilient member 90 with the axes of the through-holes 91a and the axis of the mounting bolt through-hole 74a aligned with each other (in a coaxial manner) in the front/rear direction (i.e., aligned on a common axis).

A fall-out prevention plate (fall-out prevention portion) 94, having a rectangular shape in a plan view, is continuously formed with, and provided on top of, the connecting portion 92 of the resilient member 90 via a neck portion 93. The neck portion 93 is directly inserted into the resilient-member insertion groove 83 of the holding bracket 80. Hence, the resilient member 90 is engaged with the holding bracket 80 with the positions of the through-holes 91a and the mounting bolt through-holes 81a aligned in the front/rear direction (axial direction) upon fitting the neck portion 93 of the resilient member 90 into the resilient-member insertion groove 83 of the holding bracket 80 with the fall-out prevention plate 94 positioned on the outer (upper) side of the connecting plate 82.

Figure 5:
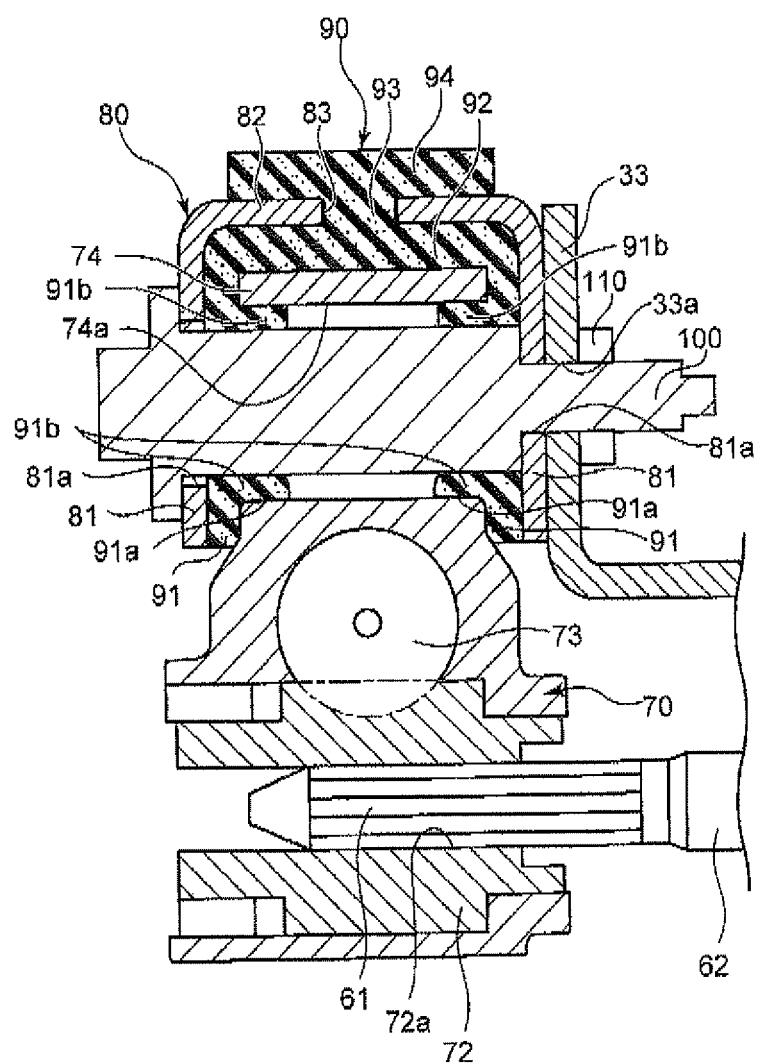
FIG. 5 is a partial enlarged cross-sectional view of FIG. 2, designated by a chain circle V.

As shown in FIG. 2 and FIG. 5, the left and right gearboxes 70 are supported on the left and right upper rails (screw-rod support rail) 30, respectively, via the holding bracket 80 (at the left and right ends of the holding bracket 80) by a mounting bolt 100 that is tightly fastened by a mounting nut 110 in a state where the gearbox 70, the holding bracket 80 and the resilient member 90 are engaged with each other with the mounting bolt through-hole 74a, the mounting bolt through-holes 81a, the through-holes 91a and the through-hole 33a of the cut-and-raised portion 33 aligned and the mounting bolt 100 extending therethrough in the front/rear direction (axial direction).

A motor 130, the axis of which extends in the left/right direction, is mounted onto the holding bracket 80 via an L-shaped mounting member 120. Namely, the L-shaped mounting member 120 is provided with a pair of female screw-holes 121 that extend in the vertical direction, and a pair of mounting bolts 124 are passed through the pair of female screw-holes 121 and the holding bracket 80 via a pair of washers 122 and a spacer 123 and are fastened to thereby mount the L-shaped mounting member 120 to the holding bracket 80. Furthermore, the motor 130 is mounted onto the L-shaped mounting member 120.

A right end of a flexible shaft FS1, which is made of a soft metal material, is connected with (and supported by) the left end of an in-built output shaft (not shown) of the motor 130 and rotates about an axis extending in the left/right direction (horizontal direction), and a left end of a flexible shaft FS2 which is longer than the flexible shaft FS1 and is made of the same metal material as that of the flexible shaft FS1 is connected with (and supported by) the right end of the in-built output shaft of the motor 130. The left end of the flexible shaft FS1 is connected with the worm 73 that is supported in the left gearbox 70 so as not to be rotatable relative thereto (i.e., so as to integrally rotate with the worm 73). The right end of the flexible shaft FS2 is connected with the worm 73 that is supported in the right gearbox 70 so as not to be rotatable relative thereto (i.e., so as to integrally rotate with the worm 73). The flexible shaft FS2 is surrounded by a pipe-shaped cover member 131, which is formed from a flexible material. A left end portion of the pipe-shaped cover member 131 is fixed onto a right end portion of the motor 130 and a right end portion of the pipe-shaped cover member 131 is fixed onto a left end portion of the right gearbox 70.

The power slider, having the above-described configuration, is assembled in the following manner. Firstly, the process for assembling a floor-mounting unit that is mounted onto the floor of a vehicle will be discussed hereinafter. The nut units 40 are respectively mounted on the lower rails (feed-nut support rails) 20, and the load transfer brackets 50 and the bearing members 15 are respectively mounted on the upper rails (screw-rod support rails) 30. Thereafter, the screw rods 60 are supported by the upper rails 30 by respectively inserting each rear-end bearing section 64 of the screw rods 60 into each corresponding bearing member 15, and screw-engaging each male threaded section 63 into the female screw-hole 44a of the corresponding resin nut 44 of the corresponding nut unit 40 and the female threaded section 57a of the corresponding nut member 57 that is positioned in between the pair of load transfer walls 51 of the load transfer bracket 50. Accordingly, the left and right pairs of lower rails 20 and upper rails 30 are supported on the floor of the vehicle so that the lower rails 20 and the upper rails 30 are mutually slidable along each other.

On the other hand, the assembly process of a connecting unit which connects to the floor-mounting unit will discussed hereinafter. First the motor 130 is mounted onto the holding bracket 80 via the L-shaped mounting member 120. Thereafter, the flexible shafts FS1 and FS2, which are supported by the in-built output rotational shaft (not shown) of the motor 130, are connected with the worms 73 that are supported by the left and right gearboxes 70, respectively, so as to not to be rotatable relative to the worms 73. Thereafter, the left and right gearboxes 70 are engaged into the corresponding left and right resilient members 90 with the mounting bolt through-hole 74a of each gearbox 70 and the through-holes 91a of the corresponding resilient member 90 being aligned in the front/rear direction by fitting the cylindrical portions 91b of each resilient member 90 into the mounting bolt through-hole 74a of the corresponding gearbox 70. Thereafter, the left and right resilient members 90 (into which the left and right gearboxes 70 are respectively engaged) are engaged with the left and right ends of the holding bracket 80 with the mounting bolt through-holes 81a of the left and right pairs of mutually facing walls 81 (of the holding bracket 80) and the through-holes 91a of the corresponding resilient members 90 (each mounting bolt through-hole 74a of the corresponding gearbox 70) aligned in the front/rear direction (axial direction) upon fit-inserting each neck portion 93 of the left and right resilient members 90 into the corresponding resilient-member insertion groove 83 of the holding bracket 80 so that each respective fall-out prevention plate 94 is positioned on the outer side of the corresponding connecting plate 82. Thereafter, each gearbox 70 is supported on the corresponding upper rail 30 via the holding bracket 80 by a mounting bolt 100 that is tightly fastened by a mounting nut 110 in a state where each gearbox 70, the holding bracket 80 and the corresponding resilient member 90 are engaged with each other with the mounting bolt through-hole 74a, the mounting bolt through-holes 81a, the through-holes 91a and the through-hole 33a of the corresponding cut-and-raised portion 33 aligned in the front/rear direction (axial direction). At the same time, the splined section 61 of each screw rod 60 is engaged into the splined hole 72a of the corresponding worm wheel so as not to be rotatable relative to each other. Thereafter, the floor-mounting unit is connected to the connecting unit, and hence, the assembly of the power slider is thus completed.

The operation of the power slider, according to the present invention, having the above-described configuration will be discussed hereinafter. A slide switch (not shown) is provided inside a vehicle (e.g., a side surface of a seat to be slided) and is slidable between an OFF position (neutral position), a first ON position (forward slide position) and a second ON position (rearward slide position). For example, if the slide switch is moved from the OFF position to the first ON position, electrical current is supplied from a battery (not shown) to the motor 130 to rotate (drive) the motor 130 forward. Subsequently, the flexible shafts FS1 and FS2 which are (rotatably) integral with the output rotational shaft of the motor 130, rotate in the clockwise direction with respect to FIG. 2. Subsequently, the worms 73 in the left and right gearboxes 70 also rotate in the clockwise direction, and furthermore, each worm wheel 72 that is engaged with the corresponding worm 73 and each corresponding screw rod 60 rotate in the anticlockwise direction, as viewed from the front. Accordingly, upon the screw rods 60 rotating, since each screw rod 60 moves forward while rotating with respect to each corresponding nut unit 40 (resin nut 44), the left and right upper rails 30 and the seat (not shown) mounted thereto move forward relative to the left and right lower rails 20 (and the vehicle floor), respectively. If the slide switch is reverted back to the OFF position from the first ON position, the sliding movement of the upper rails 30 and the seat mounted thereto stops since the supply of electrical current from the battery to the motor 130 is shut off.

Whereas, if the position of the slide switch is moved to the second ON position, electrical current is supplied from the battery to the motor 130 to rotate the motor 130 in reverse, thereby rotating each worm wheel 72 and each screw rod 60 in the clockwise direction, as viewed from the front. Subsequently, since the screw rods 60 move rearwards while rotating relative to each corresponding nut unit 40 (resin nut 44), the left and right upper rails 30 and the seat that is mounted thereto move rearward with respect to the left and right lower rails 20. When the slide switch is reverted back to the OFF position from the second ON position, since the supply of electrical current from the battery to the motor 130 is shut off, the movement of the upper rails 30 and the seat that is mounted thereto stops.

Accordingly, upon the forward and reverse rotations of the screw rods 60 by the rotational driving force of the motor 130, undulations that occur in the rotation of the screw rods 60 (eccentrical rotation with respect to the ideal rotational axis of the screw rods 60) are transmitted to each gearbox 70, and if the undulations are transmitted from the gearboxes 70 to the holding bracket 80 and the upper rails 30, this would be have an undesirable effect on the operation of the power slider, and this also generates abnormal noise.

The present invention solves this problem by positioning the cylindrical portions 91b provided in each resilient member 90 into a cylindrical space that is defined between the mounting bolt through-hole 74a of the corresponding gearbox 70 and (the outer peripheral surface of) the mounting bolt 100, as shown in FIG. 2 and FIG. 5. According to this configuration, since each resilient member 90 absorbs the undulations that occur during the rotation of the corresponding screw rod 60 while allowing for movement of the mounting bolt 100 inside the mounting bolt through-hole 74a, each gearbox 70 can favorably conform to (follow) the undulations that occur during the rotation of the corresponding screw rod 60, and transmission of vibrations from the gearboxes 70 to the holding bracket 80 and the upper rails 30 can be sufficiently suppressed. Furthermore, since the mounting bolts 100 do not contact the surfaces of the corresponding mounting bolt through-holes 74a of the gearboxes 70, abnormal noise can be prevented from being generated.

In addition, the operational effectiveness of the nut unit 40 of the illustrated embodiment is described hereinafter. Roller balls (not shown) are inserted between the lower rails 20 and the upper rails 30 in order to provide a smoother sliding action therebetween, however, it is possible for the relative position in a (vertical) direction orthogonal to the axes of the screw rods 60 and the nut unit 40 to shift relative to each other due to slight variations in the diameters of the roller balls. In the present invention, however (as shown in the illustrated embodiment), due to the structure of the combined member 47, which includes the resin nut 44 and the resilient members 45 and 46 accommodated (press-fitted) into the metal case 41, the axial position (front/rear position) of the combined member 47 is restricted due to the front end of the resilient member 45 and the rear end of the resilient member 46 forcefully abutting against the front axially separated wall 42 and the rear axially separated wall 42, respectively, while the combined member 47 is accommodated inside the metal case 41 in a "floated state" so as to be movable in a direction orthogonal to the axial direction (i.e., in a vertical direction). In other words, the inclined surface-portions 45b and 46b of the resilient members 45 and 46 resiliently abut against the inner surface of the upper axially parallel plate 43 of the metal case 41, so as to define a space (gap) between the upper surface of the central base portion 44b and the inner surface of the upper axially parallel plate 43, and define a space (gap) between the upper surfaces of the resilient members 45 and 46 (except for the inclined surface-portions 45b and 46b) and the inner surface of the upper axially parallel plate 43. Whereas, the undersurfaces of the resilient members 45 and 46 resiliently abut against the inner surface of the lower portion of the pair of axially parallel plates 43 of the metal case 41, so as to define a space (gap) between the undersurface of the central base portion 44b and the inner surface of the lower portion of the pair of axially parallel plates 43. Accordingly, the resin nut 44 can move in a direction orthogonal to the axial direction thereof (i.e., a vertical direction) within the metal case 41 by elastically deforming the inclined surface-portions 45b and 46b of the resilient members 45 and 46, and elastically deforming the undersurfaces of the resilient members 45 and 46, so as to absorb variations in the relative position in a (vertical) direction orthogonal to the axes of the screw rods 60 and the nut unit 40.

In the above-described embodiment, the cut-and-raised portions 33 are formed in the left and right upper rails 30, respectively, and the gearboxes 70 are supported on the upper rails 30, respectively, via the holding bracket 80 by inserting each mounting bolt 100 through the corresponding through-hole 33a of each cut-and-raised portion 33 and fastening each mounting nut 110 onto each mounting bolt 100; however, the present invention is not limit to such a configuration. For example, it is possible to provide a gearbox support bracket as a separate member and mount this gearbox support bracket to each of the left and right upper rails 30 or to each load transfer bracket 50, and support each gearbox 70 on the upper rails 30 via the holding bracket 80 by inserting each mounting bolt 100 through through-holes of the corresponding gearbox support bracket and fastening each mounting nut 110 onto each mounting bolt 100.

In the above-described embodiment, a gap (space) is defined (formed) between the cylindrical portions 91b of the pair of mutually facing walls 91 of each resilient member 90, however, the cylindrical portions 91b can be longer (in the axial direction) so that the ends thereof contact each other. Furthermore, the axial lengths of the cylindrical portions 91b do not have to be equal.

In the above-described embodiment, U-shaped sections provided at each of the left and right ends of the holding bracket 80 support the resilient members 90, to which the gearboxes 70 are engaged, respectively; however, the cut-and-raised portions 33 of the upper rails 30 can be further extended forward to each form a holding portion, and the resilient members 90, into which the gearbox 70 are respectively engaged, can be held by these holding portions, respectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A power slider comprising:
   a lower rail and an upper rail which are engaged with each other so as to be mutually slidable along each other;
   a screw rod which is rotatably supported on one of said lower rail and said upper rail;
   a feed nut which is supported on the other of said lower rail and said upper rail and is screw-engaged with said screw rod; and
   a gearbox which is supported on said one of said lower rail and said upper rail via a holder and which rotatably drives said screw rod,
   wherein said gearbox is provided with a mounting bolt through-hole and is supported by said holder via a mounting bolt that is inserted through said mounting bolt through-hole, and
   wherein a resilient member is positioned in a space defined between an inner surface of said mounting bolt through-hole of said gearbox and a part of an outer peripheral surface of said mounting bolt, said part being positioned inside said mounting bolt through-hole.

2. The power slider according to claim 1, wherein said resilient member is provided with a facing wall which is positioned in between mutually facing surfaces of said holder and said gearbox.

3. The power slider according to claim 2, wherein said mounting bolt through-hole of said gearbox extends in a direction parallel to the axis of said screw rod, and wherein a pair of said facing walls of said resilient member are separated in a direction parallel to the axis of the screw rod and are each positioned between the mutually facing surfaces of said holder and said gearbox so that said gearbox is sandwiched between said pair of mutually facing walls.

4. The power slider according to claim 1, wherein said holder comprises a U-shaped section defined by a pair of mutually facing walls and a connecting portion which connects said pair of mutually facing walls, wherein said connecting portion is provided with an insertion groove, and wherein said resilient member is provided with a neck portion which is fitted into said insertion groove, and a fall-out prevention portion which is connected to said connecting portion via said neck portion.

5. A power slider comprising:

a screw rod supporting rail which supports a screw rod;
a feed nut supporting rail which supports a feed nut that is screw-engaged with said screw rod, said screw rod supporting rail and said feed nut supporting rail being engaged with each other so as to be relatively slidable in length-wise directions thereof; and
a gearbox which is supported on said screw rod supporting rail to drive said screw rod;
wherein said gearbox is provided with amounting bolt through-hole, through which a mounting bolt is inserted to
mount said gearbox onto said screw rod supporting rail, and
wherein a resilient member is positioned in an annular space defined between an inner surface of said mounting bolt through-hole of said gearbox and a part of an outer peripheral surface of said mounting bolt, said part being positioned inside said mounting bolt through-hole.

* * * * *